(12) United States Patent
Spangler et al.

(10) Patent No.: US 9,115,590 B2
(45) Date of Patent: Aug. 25, 2015

(54) GAS TURBINE ENGINE AIRFOIL COOLING CIRCUIT

(71) Applicant: United Technologies Corporation, Hartford, CT (US)

(72) Inventors: Brandon W. Spangler, Vernon, CT (US); Mark F. Zelesky, Bolton, CT (US); Edwin Otero, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 686 days.

(21) Appl. No.: 13/627,072

(22) Filed: Sep. 26, 2012

(65) Prior Publication Data
US 2014/0127013 A1 May 8, 2014

(51) Int. Cl.
*F01D 5/18* (2006.01)

(52) U.S. Cl.
CPC ........ *F01D 5/18* (2013.01); *F01D 5/187* (2013.01); *F05D 2260/202* (2013.01); *F05D 2260/205* (2013.01); *F05D 2260/22141* (2013.01); *Y02T 50/676* (2013.01)

(58) Field of Classification Search
CPC ......... F01D 5/187; F01D 5/186; F01D 25/12; F05D 2260/202; F05D 2260/22141
USPC ........................... 416/97 R; 415/115
See application file for complete search history.

(56) References Cited

U.S. PATENT DOCUMENTS

| | | | |
|---|---|---|---|
| 5,246,341 A | 9/1993 | Hall et al. | |
| 5,688,104 A | 11/1997 | Beabout | |
| 6,234,754 B1 | 5/2001 | Zelesky et al. | |
| 6,533,547 B2 * | 3/2003 | Anding et al. | 416/97 R |
| 6,773,230 B2 | 8/2004 | Bather et al. | |
| 6,974,308 B2 | 12/2005 | Halfmann et al. | |
| 7,258,528 B2 | 8/2007 | Trindade et al. | |
| 7,413,403 B2 | 8/2008 | Cunha et al. | |
| 7,556,476 B1 * | 7/2009 | Liang | 416/97 R |
| 7,568,887 B1 | 8/2009 | Liang et al. | |
| 7,600,966 B2 | 10/2009 | Devore et al. | |
| 7,607,891 B2 | 10/2009 | Cherolis et al. | |
| 7,762,784 B2 | 7/2010 | Propheter-Hinckley | |
| 7,780,413 B2 * | 8/2010 | Liang | 416/97 R |
| 7,837,441 B2 | 11/2010 | Spangler et al. | |
| 7,845,906 B2 * | 12/2010 | Spangler et al. | 416/97 R |
| 7,871,246 B2 * | 1/2011 | Liang | 416/97 R |
| 2005/0265839 A1 | 12/2005 | Mongillo, Jr. et al. | |
| 2008/0175714 A1 | 7/2008 | Spangler et al. | |

(Continued)

OTHER PUBLICATIONS

International Search Report and Written Opinion for PCT Application No. PCT/US2013/061321 dated Dec. 17, 2013.

(Continued)

*Primary Examiner* — Ninh H Nguyen
(74) *Attorney, Agent, or Firm* — Carlson, Gaskey & Olds (57) ABSTRACT

A component for a gas turbine engine according to an exemplary aspect of the present disclosure includes, among other things, an airfoil that extends between a leading edge, a trailing edge, a pressure side wall and a suction side wall. A cooling circuit is disposed inside of the airfoil. The cooling circuit includes a first core cavity that radially extends inside of the airfoil. A first axial skin core is in fluid communication with the first core cavity at a first location of the first axial skin core and a second core cavity is in fluid communication with the first axial skin core at a second location of the first axial skin core.

24 Claims, 4 Drawing Sheets (56) References Cited

U.S. PATENT DOCUMENTS

2009/0047136 A1  2/2009  Chon et al.
2011/0094698 A1  4/2011  Grunstra
2011/0123311 A1  5/2011  Devore et al.
2012/0076660 A1  3/2012  Spangler et al.

OTHER PUBLICATIONS

International Preliminary Report on Patentability for PCT Application No. PCT/US2013/061321, mailed Apr. 9, 2015.

* cited by examiner

GAS TURBINE ENGINE AIRFOIL COOLING CIRCUIT

BACKGROUND

This disclosure relates to a gas turbine engine, and more particularly to an airfoil cooling circuit for cooling the airfoil.

Gas turbine engines typically include a compressor section, a combustor section and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

The compressor and turbine sections of the gas turbine engine typically include alternating rows of rotating blades and stationary vanes. The rotating blades either create or extract energy from the hot combustion gases that are communicated through the gas turbine engine, and the vanes convert the velocity of the airflow into pressure and prepare the airflow for the next set of blades. The hot combustion gases are communicated over airfoils of the blades and the vanes. The airfoils may include internal cooling circuits that receive a cooling airflow to cool the various internal and external surfaces of the airfoils.

SUMMARY

A component for a gas turbine engine according to an exemplary aspect of the present disclosure includes, among other things, an airfoil that extends between a leading edge, a trailing edge, a pressure side wall and a suction side wall. A cooling circuit is disposed inside of the airfoil. The cooling circuit includes a first core cavity that radially extends inside of the airfoil. A first axial skin core is in fluid communication with the first core cavity at a first location of the first axial skin core and a second core cavity is in fluid communication with the first axial skin core at a second location of the first axial skin core.

In a further non-limiting embodiment of the foregoing component, the component is a vane.

In a further non-limiting embodiment of either of the foregoing components, the component is a blade.

In a further non-limiting embodiment of any of the foregoing components, the first axial skin core extends inside of the pressure side wall of the airfoil.

In a further non-limiting embodiment of any of the foregoing components, a second axial skin core extends inside of the suction side wall of the airfoil.

In a further non-limiting embodiment of any of the foregoing components, a second axial skin core is in fluid communication with each of the first core cavity and the second core cavity.

In a further non-limiting embodiment of any of the foregoing components, the first core cavity and the second core cavity are positioned circumferentially between the first axial skin core and the second axial skin core.

In a further non-limiting embodiment of any of the foregoing components, the first axial skin core includes a plurality of pedestals.

In a further non-limiting embodiment of any of the foregoing components, the first axial skin core includes at least one of a plurality of ribs and a plurality of trip strips.

In a further non-limiting embodiment of any of the foregoing components, the first location is a leading edge portion of the first axial skin core and the second location is a trailing edge portion of the first axial skin core.

In a further non-limiting embodiment of any of the foregoing components, at least one passage connects the first core cavity to the first axial skin core.

In a further non-limiting embodiment of any of the foregoing components, the cooling circuit includes a leading edge cavity in fluid communication with the first core cavity.

A gas turbine engine, according to an exemplary aspect of the present disclosure includes, among other things, a compressor section and a combustor section in fluid communication with the compressor section, and a turbine section in fluid communication with the combustor section. At least one of the compressor section and the turbine section includes at least one component having an airfoil that extends between a leading edge, a trailing edge, a pressure side wall and a suction side wall, and a cooling circuit disposed inside of the airfoil. The cooling circuit includes a first core cavity that radially extends inside of the airfoil, a first axial skin core in fluid communication with the first core cavity at a first location of the first axial skin core, and a second core cavity in fluid communication with the first axial skin core at a second location of the first axial skin core.

In a further non-limiting embodiment of the foregoing gas turbine engine, a second axial skin core is in fluid communication with each of the first core cavity and the second core cavity.

In a further non-limiting embodiment of either of the foregoing gas turbine engines, the first core cavity and the second core cavity are positioned circumferentially between the first axial skin core and the second axial skin core.

In a further non-limiting embodiment of any of the foregoing gas turbine engines, the first axial skin core includes a curved portion in fluid communication with the first core cavity.

In a further non-limiting embodiment of any of the foregoing gas turbine engines, the cooling circuit includes a leading edge cavity in fluid communication with the first core cavity.

A method of cooling a component of a gas turbine engine, according to another exemplary aspect of the present disclosure includes, among other things, feeding a cooling airflow radially through a first core cavity of a cooling circuit disposed inside of an airfoil of the component, communicating the cooling airflow from the first core cavity into a first axial skin core, communicating the cooling airflow axially through the first axial skin core, and prior to expelling the cooling airflow, communicating the cooling airflow from the first axial skin core into a second core cavity of the cooling circuit.

In a further non-limiting embodiment of the foregoing method of cooling a component of a gas turbine engine, the cooling airflow may be radially communicated to a tip portion of the airfoil within the second core cavity.

In a further non-limiting embodiment of the foregoing method of cooling a component of a gas turbine engine, a portion of the cooling airflow may be communicated from the first core cavity into a leading edge cavity of the cooling circuit.

The various features and advantages of this disclosure will become apparent to those skilled in the art from the following detailed description. The drawings that accompany the detailed description can be briefly described as follows.

DETAILED DESCRIPTION

Figure 1:
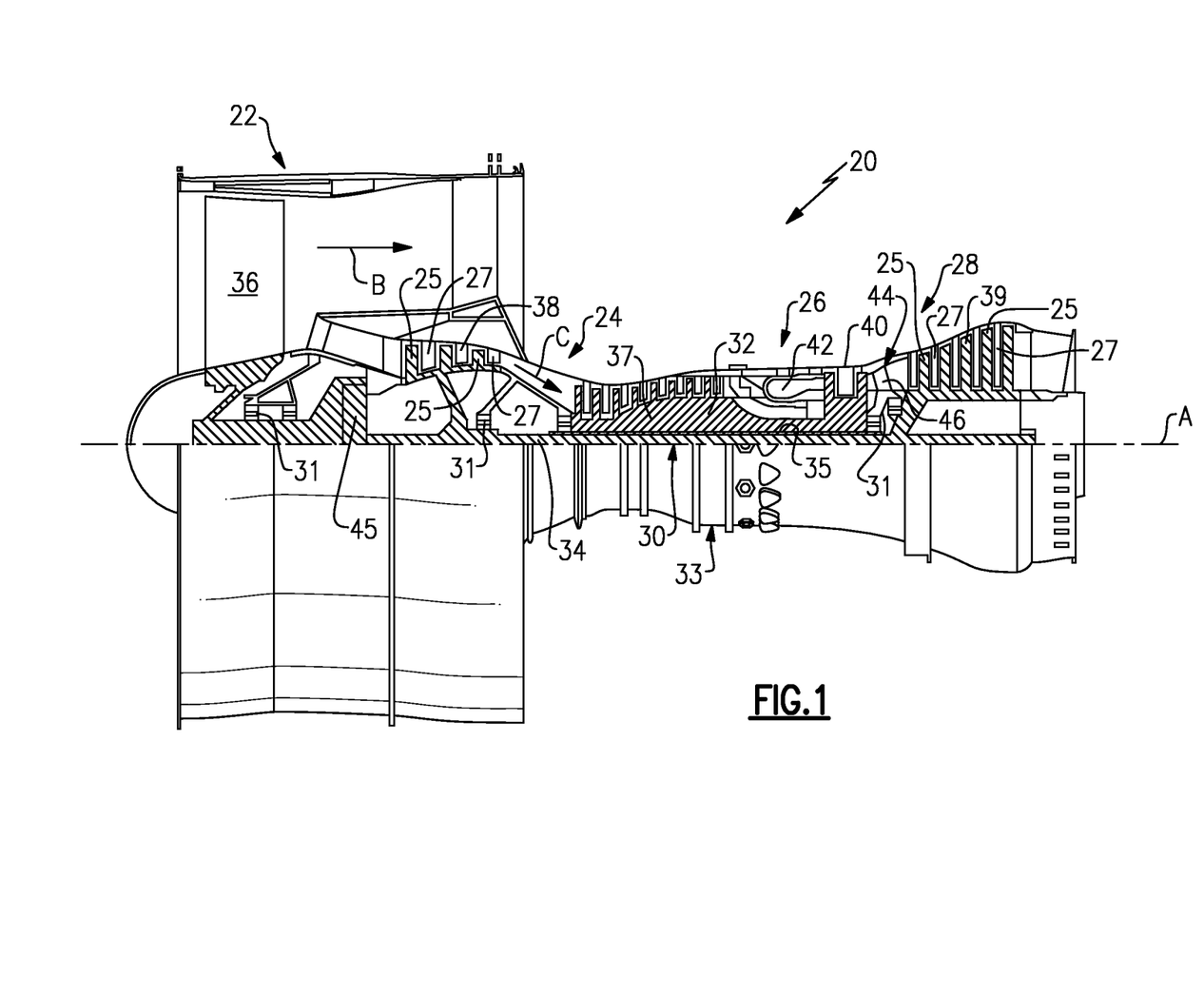
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

In a non-limiting embodiment, the gas turbine engine 20 is a high-bypass geared aircraft engine. In a further example, the gas turbine engine 20 bypass ratio is greater than about six (6:1). The geared architecture 45 can include an epicyclic gear train, such as a planetary gear system or other gear system. The example epicyclic gear train has a gear reduction ratio of greater than about 2.3, and in another example is greater than about 2.5:1. The geared turbofan enables operation of the low speed spool 30 at higher speeds, which can increase the operational efficiency of the low pressure compressor 38 and low pressure turbine 39 and render increased pressure in a fewer number of stages.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about 5 (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram\ ^\circ\ R)/(518.7^\circ\ R)]^{0.5}$, where T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core air flow to the blades 25 to either add or extract energy.

Various components of a gas turbine engine 20, such as the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits for cooling an airfoil of a component are discussed below.

Figure 2:
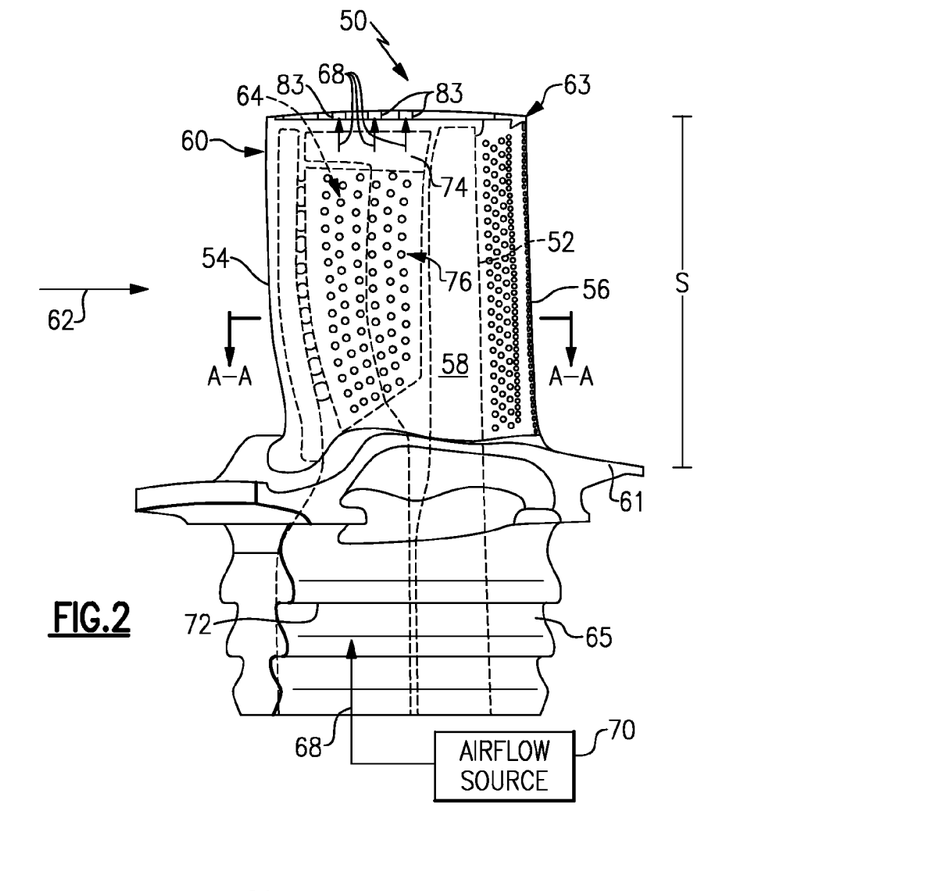
FIG. 2 illustrates a component that can be incorporated into a gas turbine engine.

FIG. 2 illustrates a component 50 that can be incorporated into a gas turbine engine, such as the gas turbine engine 20 of FIG. 1. The component 50 includes an airfoil 52 that axially extends between a leading edge 54 and a trailing edge 56 and circumferentially extends between a pressure side wall 58 and a suction side wall 60. In this embodiment, the airfoil 52 extends across a span S between a platform 61 and a tip portion 63. In other words, the component is illustrated as a blade. The platform 61 is connected to a root portion 65 for attaching the component 50 to a rotor assembly mounted for rotation about the engine centerline longitudinal axis A of the gas turbine engine 20 (FIG. 1). However, the airfoil 52 could also extend between inner and outer platforms where the component is a vane.

A gas path 62 is communicated axially downstream though the gas turbine engine 20 along the core flow path C (FIG. 1) in a direction that extends from the leading edge 54 toward the trailing edge 56 of the airfoil 52. The gas path 62 is schematically represented by an arrow and represents the communication of core airflow across the airfoil 52.

The component 50 may include a cooling circuit 64 for cooling the internal and/or external surfaces of the airfoil 52. In this embodiment, the airfoil 52 is shown in phantom to better illustrate various features of the cooling circuit 64. The cooling circuit 64 can include one or more cavities, cores, or other passages that may receive a cooling airflow 68 from an airflow source 70 that is external to the airfoil 52 to cool the airfoil 52. In this embodiment, the cooling airflow 68 enters the cooling circuit 64 through the root portion 65. However, other entrance locations are contemplated as within the scope of this disclosure.

The cooling airflow 68 is generally a lower temperature than the airflow of the gas path 62 that is communicated across the airfoil 52. In one embodiment, the cooling airflow 68 is a bleed airflow that can be sourced from the compressor section 24 or any other portion of the gas turbine engine 20 that is upstream from the component 50. The cooling airflow 68 may be circulated through the cooling circuit 64 to transfer thermal energy from the component 50 to the cooling airflow 68 and thereby cool the airfoil 52.

The cooling circuit 64 illustrated in this embodiment could be incorporated into any component that requires dedicated cooling, including but not limited to any component that extends into the core flow path C of the gas turbine engine 20. In the illustrated embodiments, and only for the purpose of providing detailed examples herein, the exemplary cooling circuit 64 of this disclosure is illustrated with respect to blades of the compressor section 24 and/or the turbine section 28. It should be understood, however, that the teachings of this disclosure are not limited to blades, and could also extend to other sections of the gas turbine engine 20, including but not limited to, the airfoils of the mid-turbine frame.

Figure 3:
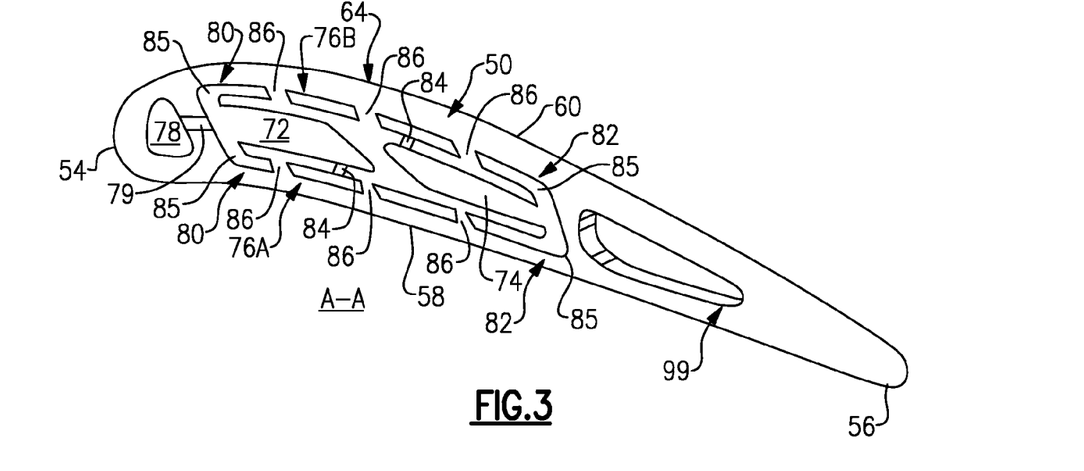
FIG. 3 illustrates a cross-sectional view through section A-A of the component of FIG. 2.

FIG. 3 (with continued reference to FIG. 2) illustrates one exemplary cooling circuit 64 that can be incorporated into the component 50. The cooling circuit 64 is generally disposed inside of the airfoil 52 and extends axially between the leading edge 54 and the trailing edge 56 and circumferentially between the pressure side wall 58 and the suction side wall 60 of the airfoil 52. Portions of the cooling circuit 64 may also extend radially across the span S of the airfoil 52 (see FIG. 2).

In one non-limiting embodiment, the cooling circuit 64 includes a first core cavity 72, a second core cavity 74 and one or more axial skin cores 76 that are in fluid communication with each of the first core cavity 72 and the second core cavity 74. In this particular embodiment, the cooling circuit 64 includes a first axial skin core 76A that is formed and extends inside the pressure side wall 58 and a second axial skin core 76B that is formed and extends inside of the suction side wall 60 of the airfoil 52. It should be understood that the cooling circuit 64 could include any number of core cavities and axial skin cores that are disposed inside of the airfoil 52.

In this embodiment, the first core cavity 72 represents a feed core cavity that receives the cooling airflow 68 from the airflow source 70, the second core cavity 74 represents a tipflag core cavity that can communicate the cooling airflow 68 radially to the tip portion 63 of the airfoil 52, and the axial skin cores 76A, 76B represent communication passages that communicate the cooling airflow 68 axially through the cooling circuit 64. The cooling circuit 64 may also include a leading edge cavity 78 that is in fluid communication with the first core cavity 72 through a passage 79. The leading edge cavity 78 communicates the cooling airflow 68 to cool the leading edge 54 of the airfoil 52.

The first core cavity 72 and the second core cavity 74 can be disposed to extend circumferentially between the first axial skin core 76A and the second axial skin core 76B. In this configuration, the first core cavity 72 and the second core cavity 74 are protected from heat load by the first axial skin core 76A and the second axial skin core 76B.

The first core cavity 72 extends radially through the root portion 65, the platform 61 and across a significant portion of the span S of the airfoil 52 (see FIG. 2). The first core cavity 72 may be in fluid communication with one or both of the axial skin cores 76A, 76B at leading edge portions 80 of the axial skin core(s) 76. The second core cavity 74 may be in fluid communication with one or both of the axial skin cores 76A, 76B at trailing edge portions 82 of the axial skin core(s) 76. Each of the leading edge portion 80 and the trailing edge portion 82 may include curved portions 85 that feed the cooling airflow 68 from the first core cavity 72 into the axial skin cores 76A, 76B, and subsequently from the axial skin cores 76A, 76B into the second core cavity 74.

In addition, one or more passages 84 may connect the first core cavity 72 and the second core cavity 74 with the axial skin cores 76A, 76B. The passages 84 are generally disposed axially between the leading edge portions 80 and the trailing edge portions 82 of the axial skin cores 76A, 76B.

The axial skin cores 76A, 76B axially extend inside the pressure side wall 58 and the suction side wall 60, respectively, and extend between the leading edge 54 and the trailing edge 56 of the airfoil 52. The axial skin cores 76A, 76B may further include a plurality of pedestals 86 that extend within the respective cores.

The second core cavity 74 radially extends between the platform 61 and the tip portion 63 of the airfoil 52 (see FIG. 2). In this manner, the second core cavity 74 can communicate cooling airflow 68 to cool the tip portion 63 of the airfoil 52.

The cooling circuit 64 may also include a trailing edge cooling circuit 99 positioned to cool the trailing edge 56 of the airfoil 52. Together, the first core cavity 72, the second core cavity 74, the axial skin core(s) 76, and the trailing edge cooling circuit 99 establish the cooling circuit 64. These features cooperate to cool the airfoil 52 with a minimum amount of dedicated cooling airflow required. The exemplary cooling circuit 64 can accommodate airfoils of various shapes and sizes without impacting the cooling capability or performance of the gas turbine engine 20.

Figure 4:
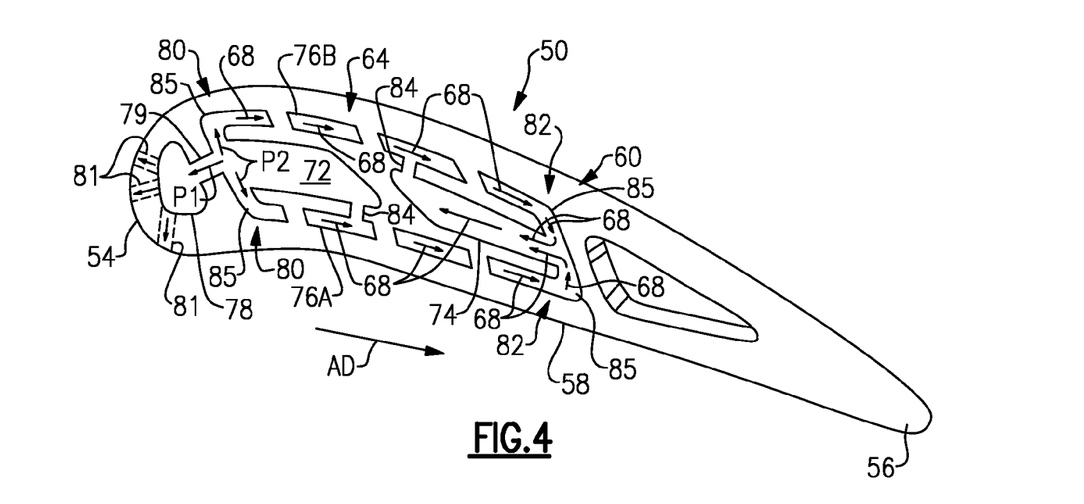
FIG. 4 schematically illustrates cooling an airfoil using an exemplary cooling circuit.

FIG. 4, with continued reference to FIGS. 2 and 3, schematically illustrates cooling a component 50 that includes the exemplary cooling circuit 64. The cooling airflow 68 is communicated into cooling circuit 64 by feeding the cooling airflow 68 into the first core cavity 72. The cooling airflow 68 is then radially communicated through the first core cavity 72. A first portion P1 of the cooling airflow 68 may be communicated into the leading edge cavity 78 via the passage 79. The portion P1 of the cooling airflow 68 is discharged from the leading edge cavity 78 through one or more film holes 81.

A second portion P2 of the cooling airflow 68 may be communicated into the axial skin cores 76A, 76B at the leading edge portions 80 of the axial skin cores 76A, 76B. The second portions P2 of the cooling airflow 68 may enter the axial skin cores 76A, 76B at any location along the radial length of the first core cavity 72. The cooling airflow 68 next enters the curved portions 85 of the leading edge portions 80 prior to being communicated in an axial direction AD within the axial skin cores 76A, 76B.

Next, rather than expelling the cooling airflow 68 through film cooling holes formed in the pressure side wall 58 and the suction side wall 60, the cooling airflow 68 may be reused to cool other portions of the airfoil 52. For example, the cooling airflow 68 within the axial skin cores 76A, 76B may enter the curved portions 85 of the trailing edge portions 82 of the axial skin cores 76A, 76B and then be communicated into the second core cavity 74.

Once within the second core cavity 74, the cooling airflow 68 may travel radially to the tip portion 63 of the airfoil 52 to cool the tip portion 63. The cooling airflow 68 may then be discharged from the second core cavity 74 through one or more film holes 83 through the tip portion 63 (see FIG. 2).

Figure 5:
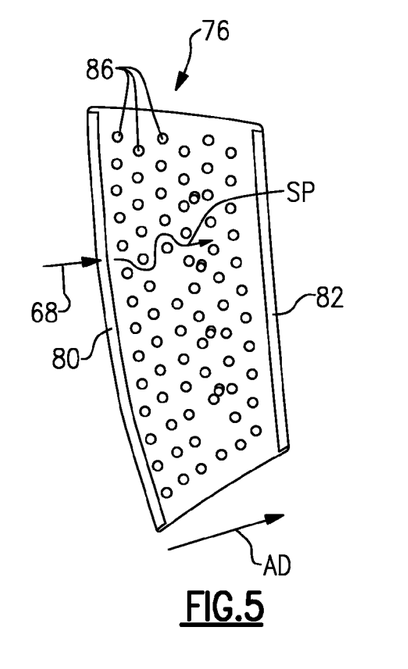
FIG. 5 illustrates an axial skin core of a cooling circuit.

FIG. 5 illustrates one non-limiting embodiment of an axial skin core 76 that can be incorporated into the cooling circuit 64. The axial skin core 76 may be representative of either a core that is defined inside either the pressure side wall 58 or the suction side wall 60 of the airfoil 52. The axial skin core 76 may include a plurality of pedestals 86 arranged therein. The plurality of pedestals 86 may be arranged in a staggered relationship such that the cooling airflow 68 that flows in the axial direction AD through the axial skin core 76 is forced to flow along a serpentine path SP. The pedestals 86 thereby increase the heat transfer coefficient of the cooling circuit 64, particularly within the axial skin core 76.

Figure 6:
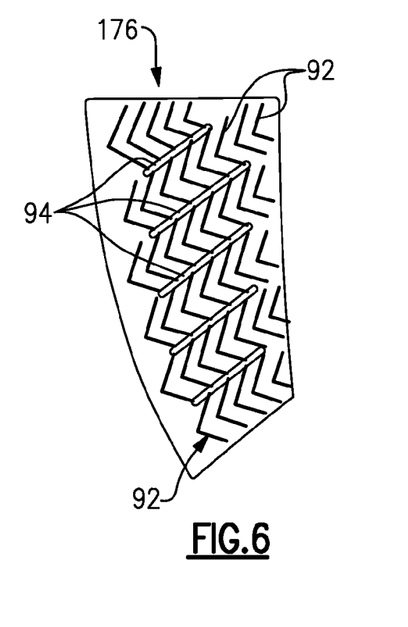
FIG. 6 illustrates another axial skin core that can be incorporated into a cooling circuit.

FIG. 6 illustrates another exemplary axial skin core 176 that can be incorporated into the cooling circuit 64. In this disclosure, like reference numerals indicate like features, whereas reference numerals modified by '100' signify modified features. In this embodiment, the axial skin core 176 includes alternative augmentation features in place of the pedestals 86 illustrated in FIG. 5. In one embodiment, the axial skin core 176 includes trip strips 92. In another embodiment, the axial skin core 76 includes ribs 94. In yet another embodiment, the axial skin core 176 can include both trip strips 92 and ribs 94. Any of the pedestals 86, the trip strips 92 and the ribs 94, or any combination of these features, may increase the heat transfer coefficient within the axial skin cores 76, 176.

Figure 7:
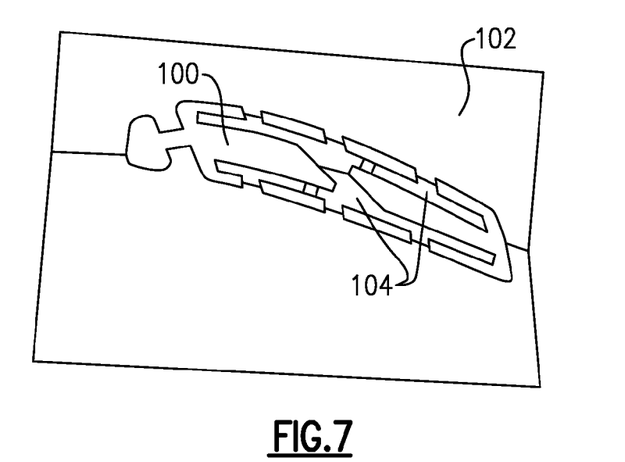
FIG. 7 schematically illustrates a manufacturing method that can be used to cast an airfoil having a cooling circuit.

FIG. 7 illustrates one exemplary method for manufacturing the component 50 to include the cooling circuit 64. In this embodiment, the cooling circuit 64, including the first core cavity 72, the second core cavity 74, and the axial skin core(s) 76, can be made using a single-piece ceramic core 100. The ceramic core 100 is positioned within a core die 102. Sacrificial thermoplastic pieces 104 may be assembled into the ceramic core 100. The sacrificial thermoplastic pieces 104 are melted during a casting process to leave voids in the ceramic core 100. One exemplary non-limiting method for manufacturing the component 50 to include the cooling circuit 64 is described by U.S. Patent Publication 2011/0094698, the disclosure of which is incorporated herein by reference.

Figure 8:
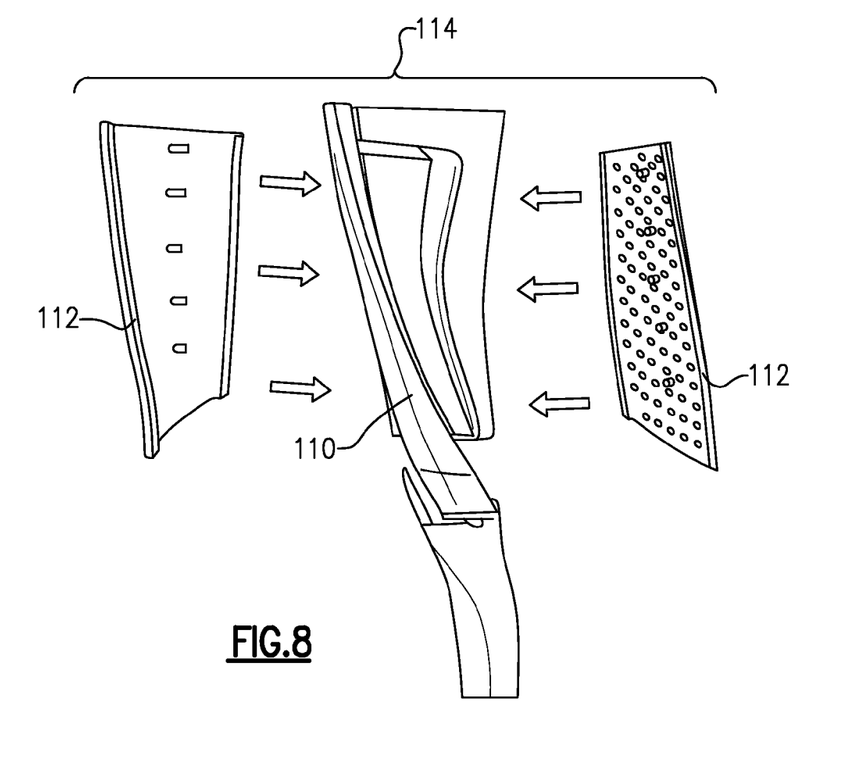
FIG. 8 schematically illustrates another manufacturing method that can be used to cast an airfoil having a cooling circuit.

FIG. 8 illustrates yet another exemplary method for manufacturing a component 50 having the cooling circuit 64 described above. In this embodiment, a ceramic core 110 and refractory metal cores 112 are used to create the cooling circuit 64. The ceramic core 110 forms the first core cavity 72 and the second core cavity 74, while the refractory metal cores 112 form the axial skin cores 76. To assemble the core, the refractory metal cores 112 may be inserted into slots and glued to the ceramic core 110. The assembled core 114 may then be inserted into a die to cast the component 50 having the cooling circuit 64 using any conventional casting process.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A component for a gas turbine engine, comprising:
   an airfoil that extends between a leading edge, a trailing edge, a pressure side wall and a suction side wall; and
   a cooling circuit disposed inside of said airfoil, wherein said cooling circuit includes:
      a first core cavity that radially extends inside of said airfoil;
      a first axial skin core in fluid communication with said first core cavity at a first location of said first axial skin core; and
      a second core cavity in fluid communication with said first axial skin core at a second location of said first axial skin core, and said second core cavity is a tipflag core cavity extending into a tip portion of said airfoil.

2. The component as recited in claim 1, wherein the component is a vane.

3. The component as recited in claim 1, wherein the component is a blade.

4. The component as recited in claim 1, wherein said first axial skin core extends inside of said pressure side wall of said airfoil.

5. The component as recited in claim 4, comprising a second axial skin core that extends inside of said suction side wall of said airfoil.

6. The component as recited in claim 1, comprising a second axial skin core in fluid communication with each of said first core cavity and said second core cavity.

7. The component as recited in claim 6, wherein said first core cavity and said second core cavity are positioned circumferentially between said first axial skin core and said second axial skin core.

8. The component as recited in claim 1, wherein said first axial skin core includes a plurality of pedestals.

9. The component as recited in claim 1, wherein said first axial skin core includes at least one of a plurality of ribs and a plurality of trip strips.

10. The component as recited in claim 1, wherein said first location is a leading edge portion of said first axial skin core and said second location is a trailing edge portion of said first axial skin core.

11. The component as recited in claim 1, comprising at least one passage that connects said first core cavity to said first axial skin core.

12. The component as recited in claim 1, wherein said cooling circuit includes a leading edge cavity in fluid communication with said first core cavity.

13. The component as recited in claim 1, wherein said tipflag core cavity is L-shaped and is configured to feed a cooling airflow to said tip portion.

14. The component as recited in claim 1, comprising at least one film hole disposed at said tip portion.

15. The component as recited in claim 1, wherein a leading edge portion of said first axial skin core includes a curved portion connected to said first core cavity.

16. A gas turbine engine, comprising:
a compressor section;
a combustor section in fluid communication with said compressor section;
a turbine section in fluid communication with said combustor section; and
wherein at least one of said compressor section and said turbine section includes at least one component having an airfoil that extends between a leading edge, a trailing edge, a pressure side wall and a suction side wall, and a cooling circuit disposed inside of said airfoil, wherein said cooling circuit includes:
a first core cavity that radially extends inside of said airfoil;
a first axial skin core in fluid communication with said first core cavity at a first location of said first axial skin core; and
a second core cavity in fluid communication with said first axial skin core at a second location of said first axial skin core, and said second core cavity is a tipflag core cavity extending into a tip portion of said airfoil.

17. The gas turbine engine as recited in claim 16, comprising a second axial skin core in fluid communication with each of said first core cavity and said second core cavity.

18. The gas turbine engine as recited in claim 17, wherein said first core cavity and said second core cavity are positioned circumferentially between said first axial skin core and said second axial skin core.

19. The gas turbine engine as recited in claim 16, wherein said first axial skin core includes a curved portion in fluid communication with said first core cavity.

20. The gas turbine engine as recited in claim 16, wherein said cooling circuit includes a leading edge cavity in fluid communication with said first core cavity.

21. The component as recited in claim 16, wherein said tipflag core cavity is L-shaped and is configured to feed a cooling airflow to said tip portion.

22. The component as recited in claim 16, wherein a leading edge portion of said first axial skin core includes a curved portion connected to said first core cavity.

23. A method of cooling a component of a gas turbine engine, comprising the steps of:
feeding a cooling airflow radially through a first core cavity of a cooling circuit disposed inside of an airfoil of the component;
communicating the cooling airflow from the first core cavity into a first axial skin core;
communicating the cooling airflow axially through the first axial skin core;
prior to expelling the cooling airflow, communicating the cooling airflow from the first axial skin core into a second core cavity of the cooling circuit; and
radially communicating the cooling airflow to a tip portion of the airfoil within the second core cavity.

24. The method as recited in claim 23, comprising the step of:
communicating a portion of the cooling airflow from the first core cavity into a leading edge cavity of the cooling circuit.

* * * * *